US012715562B2

(12) United States Patent
Shiue

(10) Patent No.: US 12,715,562 B2
(45) Date of Patent: Aug. 25, 2026

(54) BREATHABLE MASK

(71) Applicant: QBAS Co., Ltd., Taipei City (TW)

(72) Inventor: Chih-Cheng Shiue, Taipei City (TW)

(73) Assignee: QBAS CO., LTD., Taipei City (TW)

( * ) Notice: Subject to any disclaimer, the term of this patent is extended or adjusted under 35 U.S.C. 154(b) by 646 days.

(21) Appl. No.: 18/193,384

(22) Filed: Mar. 30, 2023

(65) Prior Publication Data

US 2023/0322345 A1 Oct. 12, 2023

Related U.S. Application Data

(60) Provisional application No. 63/326,418, filed on Apr. 1, 2022.

(51) Int. Cl.

| | |
|---|---|
| ***B63C 11/16*** | (2006.01) |
| ***B63C 11/20*** | (2006.01) |
| *A62B 18/02* | (2006.01) |
| *A62B 18/10* | (2006.01) |

(52) U.S. Cl.
CPC ............ *B63C 11/16* (2013.01); *B63C 11/205* (2013.01); *A62B 18/02* (2013.01); *A62B 18/10* (2013.01); *B63C 2011/165* (2013.01)

(58) Field of Classification Search
CPC ... B63C 11/16; B63C 11/12; B63C 2011/165; B63C 11/205; A62B 18/02; A62B 18/10
See application file for complete search history.

(56) References Cited

U.S. PATENT DOCUMENTS

| | | | | |
|---|---|---|---|---|
| 5,267,556 A * | 12/1993 | Feng | B63C 11/205 128/207.14 |
| 6,302,102 B1 * | 10/2001 | Giroux | B63C 11/205 128/201.28 |
| 6,371,116 B1 * | 4/2002 | Resnick | A62B 17/04 2/202 |
| 2006/0272637 A1 * | 12/2006 | Johnson | B63C 11/205 128/201.27 |
| 2016/0059051 A1 * | 3/2016 | Hansel | A62B 18/08 128/201.19 |
| 2016/0271454 A1 * | 9/2016 | Lo | A63B 33/002 |
| 2016/0297505 A1 * | 10/2016 | Caprice | B63C 11/16 |
| 2018/0297676 A1 * | 10/2018 | Zheng | B63C 11/16 |

(Continued)

FOREIGN PATENT DOCUMENTS

WO WO-02055379 A2 * 7/2002 ........... B63C 11/186

*Primary Examiner* — Timothy A Stanis
*Assistant Examiner* — Alec R Wahl
(74) *Attorney, Agent, or Firm* — MUNCY, GEISSLER, OLDS & LOWE, P.C.

(57) ABSTRACT

A breathable mask including a breathing tube and a body is provided. The body is connected to the breathing tube so that an interior of the body is in fluid communication with an outside through the breathing tube. The body includes a main frame, a lens, a waterproof skirt, a purge valve and a mouthpiece. The waterproof skirt has a portion embedded in the main frame and a partition to divide the interior of the body into an upper chamber and a lower chamber. The purge valve is disposed at a lower portion of the body and in one-way fluid communication with the lower chamber. The mouthpiece disposed in the lower chamber has a first end and a second end opposite to the first end. The first end is contained in a user's mouth and the second end is in fluid communication with the purge valve.

14 Claims, 10 Drawing Sheets

(56) References Cited

U.S. PATENT DOCUMENTS

| | | | | |
|---|---|---|---|---|
| 2019/0358496 | A1* | 11/2019 | Shiue | A63B 33/002 |
| 2020/0216157 | A1* | 7/2020 | Xiao | B63C 11/205 |
| 2021/0284300 | A1* | 9/2021 | Barone | B63C 11/16 |

* cited by examiner

BREATHABLE MASK

CROSS-REFERENCES TO RELATED APPLICATIONS

This patent application claims the benefit of U.S. Prov. Ser. No. 63/326,418 filed on Apr. 1, 2022, which are incorporated in its entirety by reference.

BACKGROUND OF THE INVENTION

Field of the Invention

The present invention is a full-face mask for water activities, particularly a breathable mask with a mouthpiece.

Descriptions of the Related Art

The full-face snorkel mask (FFSM) currently used in snorkeling activities has a body that covers the eyes, nose, and mouth, a breathing tube assembled on the top of the body, and a purge valve disposed in the lowermost portion of the body. The interior of the body is provided with intake and an exhaust passages connected to the breathing tube so that the interior of the main body can be in fluid communication with the outside through the passages and the breathing tube. Therefore, when the user wears the FFSM, the nose and mouth can inhale through the breathing tube and the intake passage. As for exhalation, dirty air is discharged upwards through the exhaust passage and breathing tube.

When the user wears the traditional FFSM for snorkeling underwater and often faces down, the accumulated water in the mask body will easily contact the user's nose because the nose and mouth share the same chamber. This may cause discomfort and the psychological pressure of being possibly choked on water during snorkeling. However, since the purge valve is disposed in the lowermost portion of the body instead of aligning with the user's mouth (i.e., the valve is not likely to be parallel to the water surface), the accumulated water in the mask body will not be held in the reservoir formed around the purge valve. It becomes difficult to drain the water by overcoming the pressure existing under the water surface. Therefore, when the user faces the problem regarding the water leaking in the mask body, although there is a purge valve disposed in the lowermost portion of the mask for the water draining without the user's taking off the mask, the user still has to look up, or even let the mask be fully out of water, so as to exert enough push force to have the purge valve to work and drain. The above drainage acts significantly consume physical energy, especially when the user is already exhausted.

As a matter of fact, when encountering the problem regarding the water leaking in the mask body, users usually get up quickly, take off the mask and pour out the water inside out. It does not make the purge valve really function, brings in safety concerns, interrupts snorkeling, and has less fun of underwater activities.

In addition, due to the large size of the traditional FFSM, to ensure that the mask fits the user's face stably, a four-point fixed cross-type head strap must be designed to tie the mask onto the user's head. The structure is complicated, needs much more parts, and is not easy to carry.

Given this, there is an urgent need in the art for a technology that partially or wholly improves the above-mentioned shortcomings, so as to improve product reliability and increase the safety and comfort of users when snorkeling.

SUMMARY OF THE INVENTION

An objective of the present invention is to provide a breathable mask, in which the interior the mask body is assembled with a mouthpiece. Specifically, one end of the mouthpiece is to be contained in the user's mouth, and the other end is communication with the purge valve located in the lower portion of the mask body, so as to establish an independent concrete channel for the exhalation path formed from the user's mouth to the purge valve, thereby increasing the pressure and efficiency of drainage and exhaust. In addition, when the user faces down for snorkeling, the accumulated water leaking into the mask body can be concentrated in the independent channel, which is more conducive to the drainage of the user when exhaling heavily through the mouth, and also prevents the accumulated water inside from contacting the user's nose and mouth. Moreover, because the mouthpiece is provided to be contained in the user's mouth, the mask becomes more stable when being worn. This way, the simplest and most convenient two-point fixed head strap can be used instead of the more complicated designs of three-point or four-point fixed head strap.

To achieve the aforesaid objective, the present invention provides a breathable mask, comprising: a breathing tube; and a body connected to the breathing tube so that an interior of the body is in fluid communication with an outside through the breathing tube. The body includes: a main frame; a lens connected to the main frame; a waterproof skirt having a portion embedded in the main frame and having a partition to divide the interior of the body into an upper chamber and a lower chamber; a purge valve disposed in a lower portion of the body and being in one-way fluid communication with the lower chamber; and a mouthpiece disposed at the lower chamber and having a first end to be contained in a mouth of a user and a second end opposite to the first end to be in fluid communication with the purge valve.

DESCRIPTION OF THE PREFERRED EMBODIMENT

In the following description, the present invention will be explained with reference to various embodiments thereof. These embodiments of the present invention are not intended to limit the present invention to any specific environment, applications or particular method for implementations described in these embodiments. Therefore, the description of these embodiments is only for the purpose of illustration rather than to limit the present invention. It shall be appreciated that, in the following embodiments and the attached drawings, elements not directly related to the present invention are omitted from the depiction, and dimensional proportions among individual elements in the attached drawings are provided only for ease of understanding but not to limit the actual scale of the present invention.

Figure 1A:
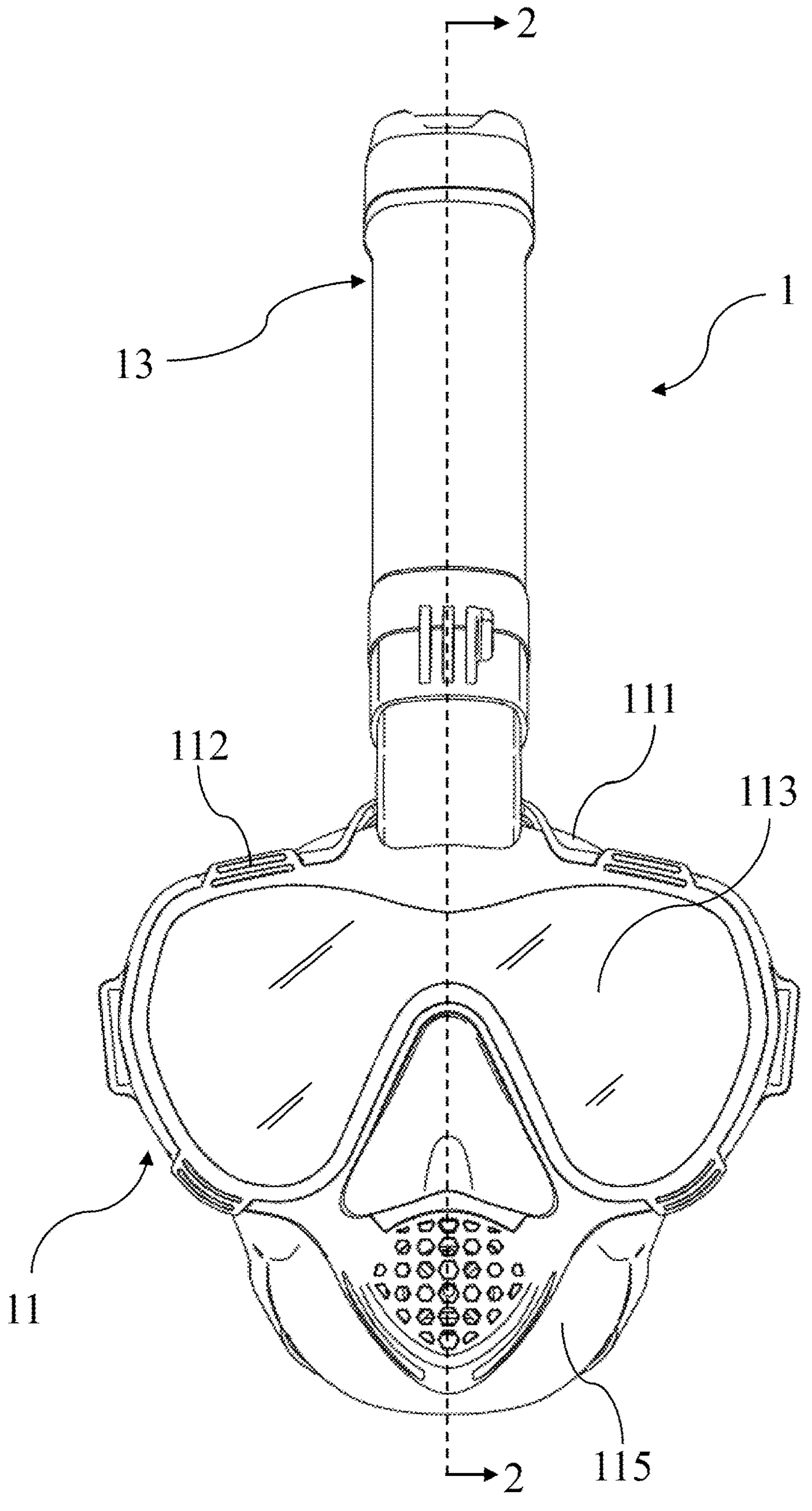
FIG. 1A and FIG. 1B illustrates a schematic front view and a schematic rear view of a breathable mask according to an embodiment of the present invention, respectively.
Figure 1B:
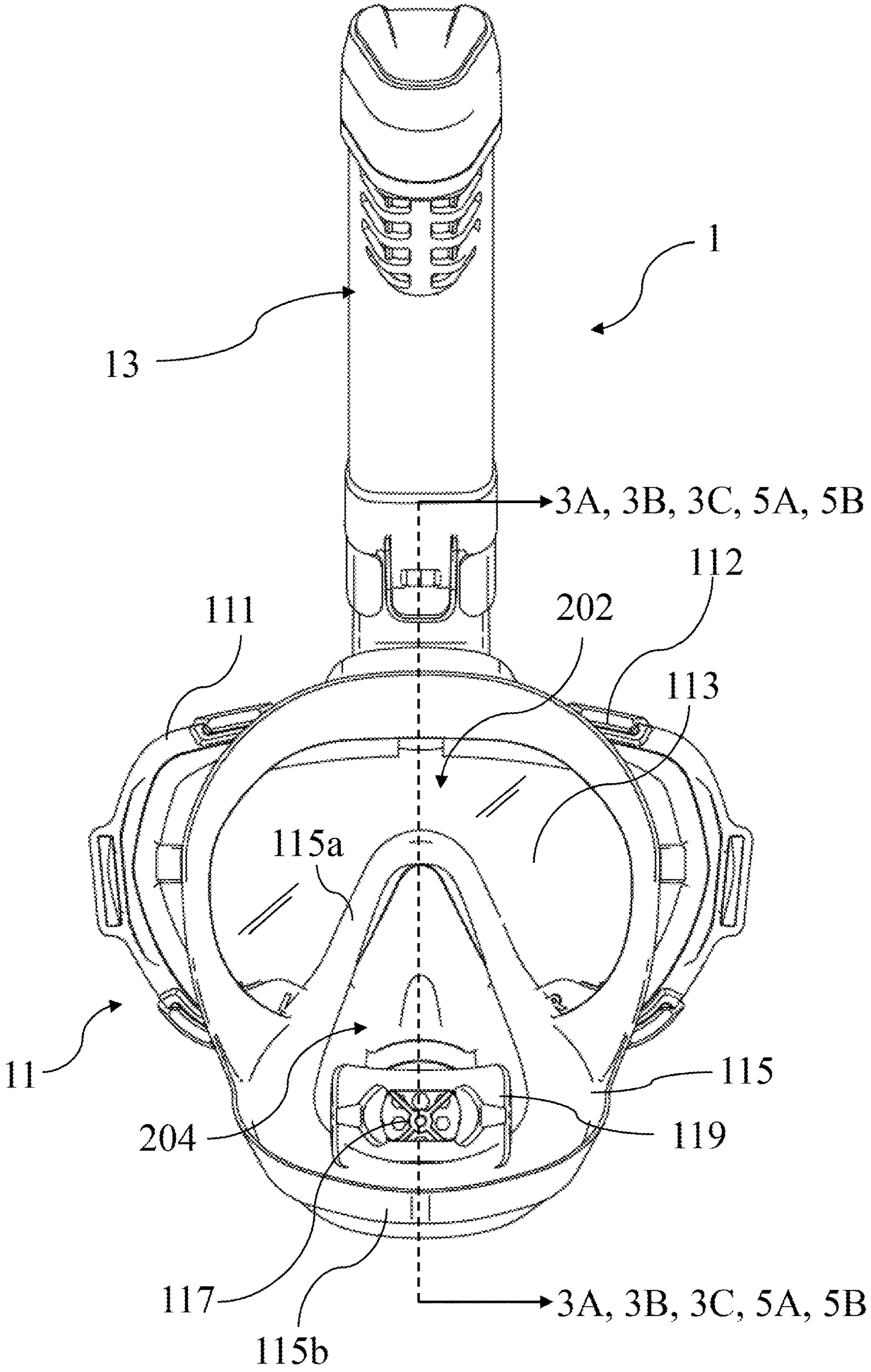

The first embodiment of the present invention is shown in FIGS. 1A and 1B. FIG. 1A illustrates a front view of a breathable mask 1 of the present invention, and FIG. 1B illustrates a rear view of the breathable mask 1. The breathable mask 1 includes a body 11 and a breathing tube 13. The body 11 is connected to the breathing tube 13 so that the interior of the body 11 is in fluid communication with the outside through the breathing tube 13. As a result, when the user wears the breathable mask 1 for snorkeling activities, the user can inhale in fresh air through the breathing tube 13 and exhale out dirty air through the breathing tube 13.

Figure 2:
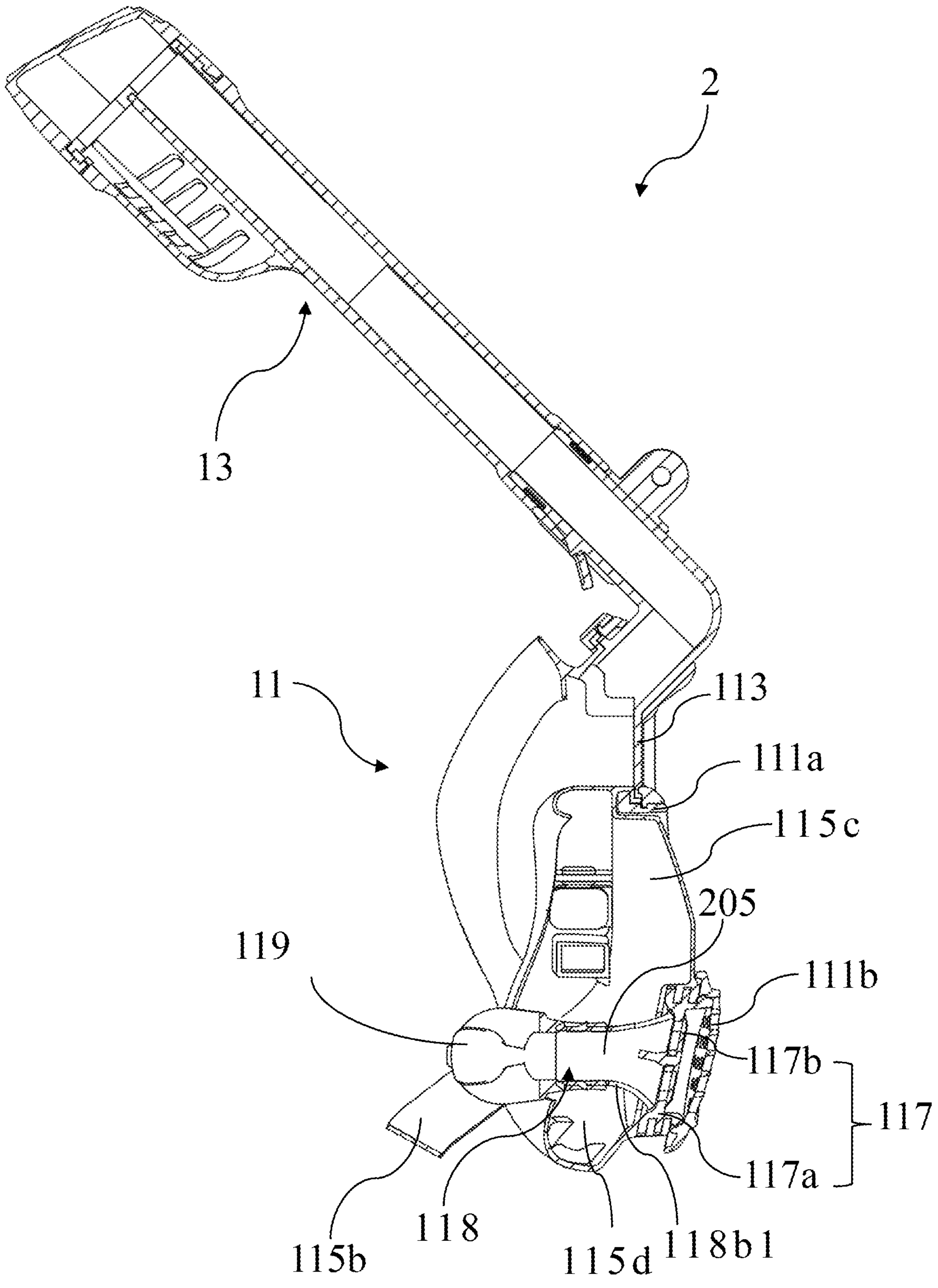
FIG. 2 is a sagittal cross-sectional view of a breathable mask, taken from line 2-2 of FIG. 1A.

The body 11 includes a main frame 111, a secondary frame 112, a lens 113, a waterproof skirt 115, a purge valve 117 and a mouthpiece 119. The mouthpiece 119 is fixed to, integrally formed with or detachably connected to the purge valve 117. In one embodiment, in the condition that the volume of the lower chamber 204 is controlled at about 200 ml to achieve good exhaust and drainage effects, the inner volume of the channel 205 (as shown in FIG. 2) formed between the mouthpiece 119 and the purge valve 117 can be designed to be less than 20 ml.

It shall be appreciated that in this embodiment, the lens 113 is, but not limited to, a detachable lens, so the corresponding regions of the lens 113 and the waterproof skirt 115 are fixed to the main frame 111 by the secondary frame 112. However, in other embodiments, the lens can be a non-detachable lens directly fixed on the main frame, so there is no need to provide a secondary frame fixing the lens. In addition, in this embodiment, the lens 113 can extend above the main frame 111 to provide a structure for connecting the breathing tube 13. However, in other embodiments, the structure for connecting the breathing tube 13 can be provided by the main frame 111. Therefore, the connection structure between the main body 11 and the breathing tube 13 is not intended to limit the present invention.

A part of the waterproof skirt 115 is embedded in the main frame 111, and has a partition 115*a* which divides the interior of the main body 11 into an upper chamber 202 and a lower chamber 204. The purge valve 117 is disposed in the lower portion of the body 11 and is in one-way fluid communication with the lower chamber 204 so that users can drain and exhaust through the purge valve 117.

Furthermore, in this embodiment, the purge valve 117 is substantially aligned with the user's mouth. Therefore, when the user faces down for snorkeling underwater, the purge valve 117 can tend to substantially parallel to the water surface so that the accumulated water within the mask body can be concentrated in the reservoir of the purge valve 117 for easy drainage and exhaust. The mouthpiece 119 is disposed in the lower chamber 204 and has a first end (proximal to the user) for the user's mouth to contain and a second end (distal from the user) opposite to the first end and being in fluid communication with the purge valve 117. With the aid of the fluid communication channel 205 formed between the mouthpiece 119 and the purge valve 117, when the user exhales heavily through the mouth, the exhaled airflow can flow intensively toward the purge valve 117 through the channel 205 to make drainage and exhaust well.

In addition, as shown in FIG. 1B, the waterproof skirt 115 may further include a chin strap 115*b* for the user to place it on the chin to increase the stability of the breathable mask 1 when snorkeling. The chin strap 115*b* can be integrally formed with the waterproof skirt 115 at a lower portion thereof, which is generally aligned with the jawbone of most users in order to be fastened easily. In other embodiments, the chin strap can also be arranged in an alternative way, such as being assembled or glued, at the lower portion of the waterproof skirt 115 in a reasonable way. That is, the installation method of the chin strap does not limit the scope of the present invention.

In one embodiment, since the breathable mask 1 of the present invention provides a mouthpiece 119 for the user to contain in the mouth, the wearing of the breathable mask 1 can be made more stable. This way, for the breathable mask 1, the simplest and more convenient two-point head strap (not shown) can be used, instead of the complicated designs of three-point or four-point fixed head strap. It is adequately stable even the breathable mask 1 is no longer provided with the chin strap 115*b*.

The second embodiment of the present invention is shown in FIG. 2, which illustrates a sagittal cross-sectional view of a breathable mask 2 of the present invention. The main body 11 may further include a connector 118 disposed between the purge valve 117 and the mouthpiece 119. The connector 118 is fixed to, integrally formed with or detachably connected to at least one of the purge valve 117 and the mouthpiece 119.

In addition, as shown in FIG. 2, the main frame 111 may include a lens frame 111*a* for the lens 113 to be embedded therein, and a mouth frame 111*b* located below the lens frame 111*a*. The lens frame 111*a* and the mouth frame 111*b* correspondingly cover the user's eyes and mouth, respectively. The waterproof skirt 115 also includes a nose covering portion 115*c* and a mouth skirt portion 115*d*, the nose covering portion 115*c* protrudes outwards between the lens frame 111*a* and the mouth frame 111*b*, and the purge valve 117 is interposed between the mouth frame 111*b* and the mouth skirt portion 115*d*.

In addition, the purge valve may have a seat 117*a* and a film 117*b* disposed on the seat 117*a*. As shown in FIG. 2, the seat 117*a* is disposed in an opening of the mouth skirt portion 115*d*. In one embodiment, in the case that the volume of the lower chamber 204 is controlled at about 200 ml, the diameter of the seat 117*a* is preferably 23-28 mm, so as to easily push the film 117*b* to work.

Figure 3A:
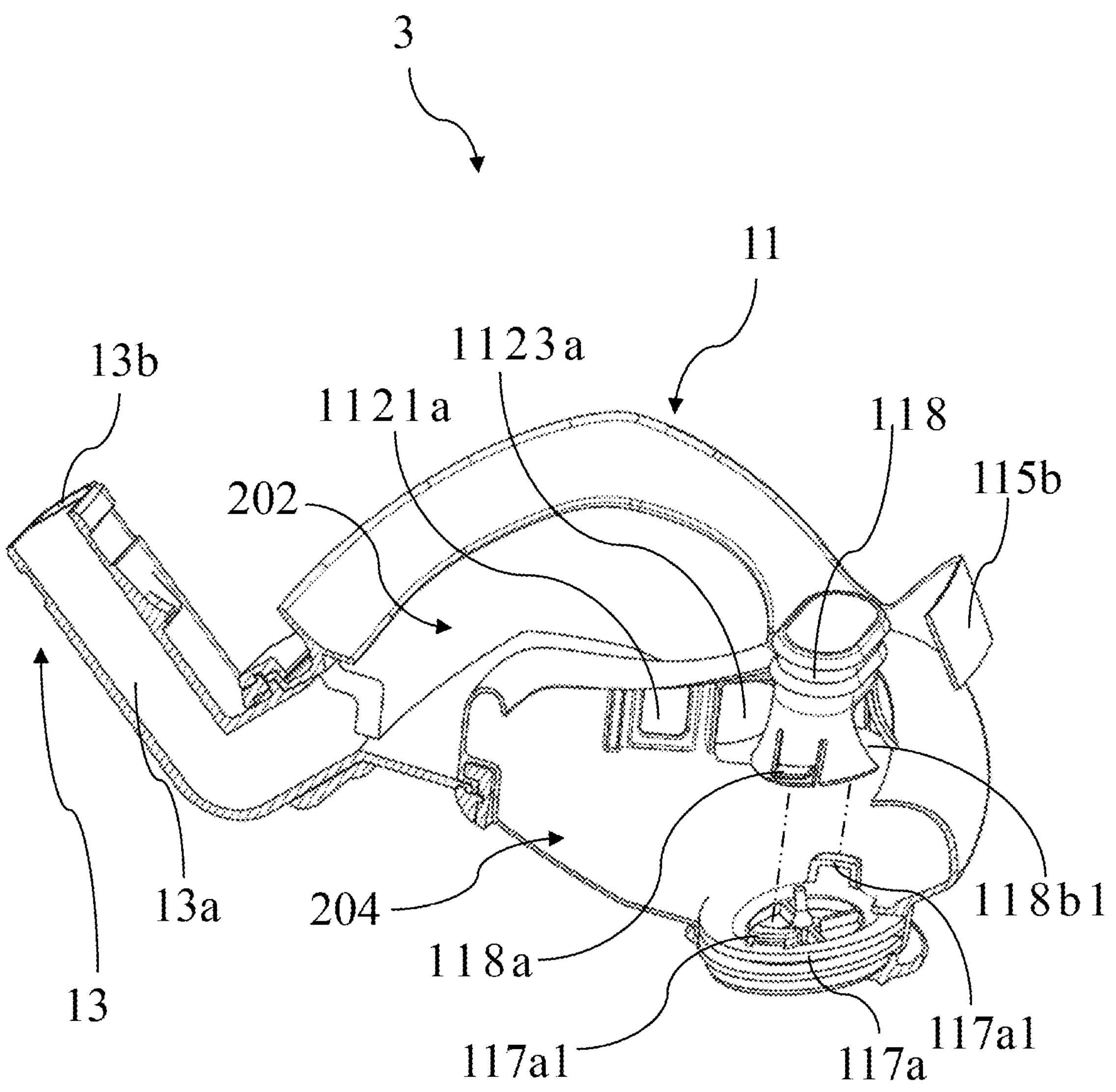
FIG. 3A is a sagittal partial cross-sectional view, taken from line 3A-3A of FIG. 1B, which, corresponding to FIG. 2, shows a schematic view of the uncut connector before being assembled to the uncut purge valve.
Figure 3B:
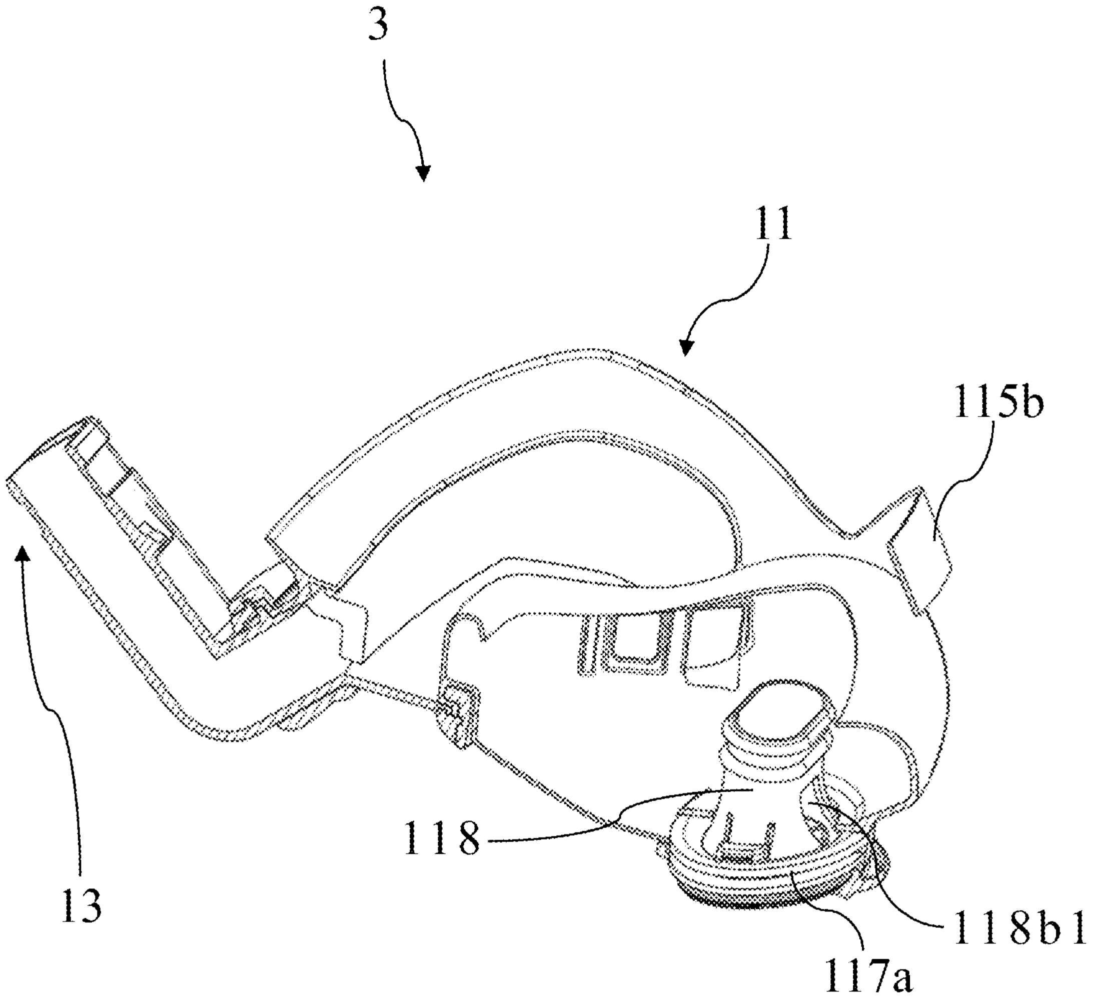
FIG. 3B is a sagittal partial cross-sectional view, taken from line 3B-3B of FIG. 1B, which, corresponding to FIG. 3A, shows a schematic view of the uncut connector assembled to the uncut purge valve.
Figure 3C:
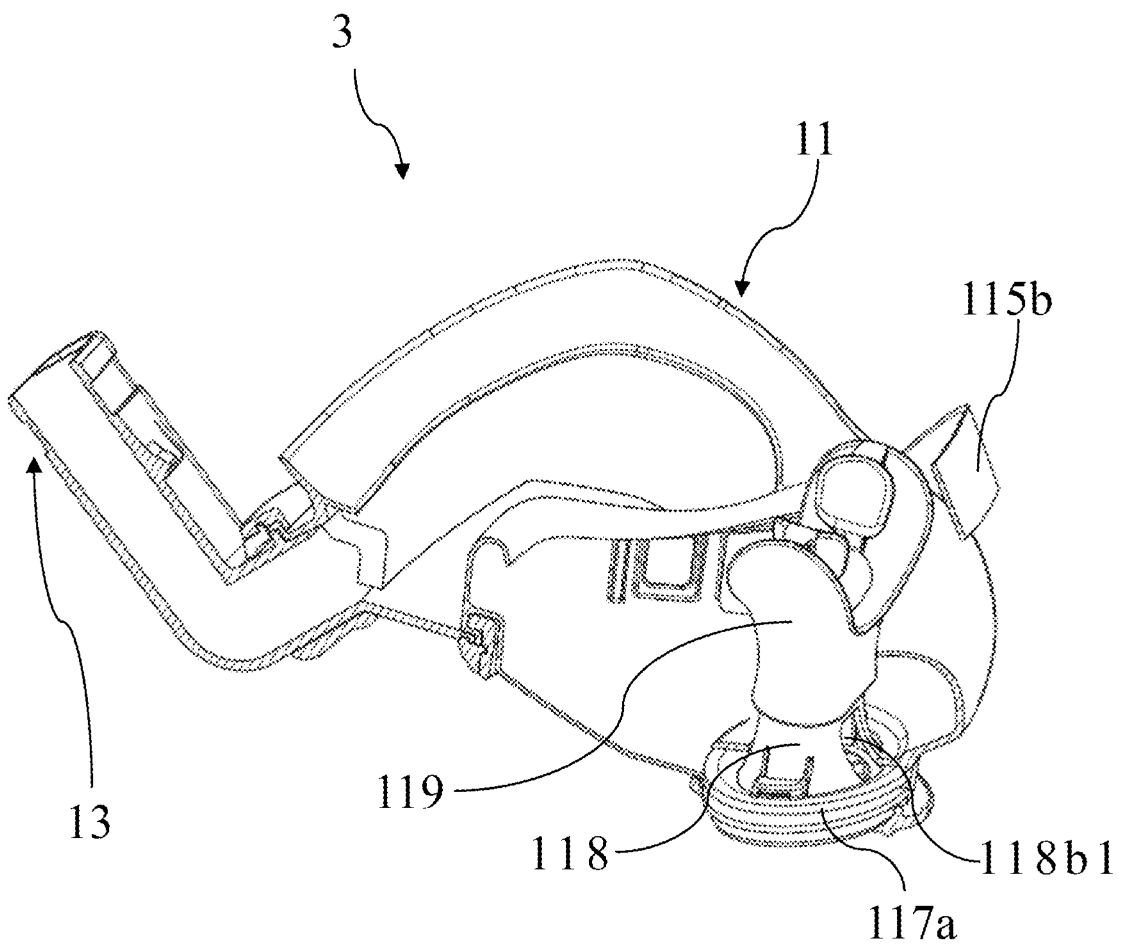
FIG. 3C is a sagittal partial cross-sectional view, taken from line 3C-3C of FIG. 1B, which, corresponding to FIG. 3B, shows a schematic view of the uncut mouthpiece, connector and purge valve being assembled together.

The third embodiment of the present invention is shown in FIGS. 3A, 3B, and 3C, which are side cross-sectional views of a breathable mask 3 of the present invention, illustrating the detachable connection of the connector 118 to the purge valve 117 and the mouthpiece 119.

As shown in FIGS. 3A to 3C, the connector 118 is in hold-down connection with the purge valve 117, wherein the connector 118 is provided with a male fastener 118*a*, and the seat 117*a* is provided with a female fastener 117*al* being detachably coupled to the male fastener 118*a*. In this way, when the connector 118 is assembled with the seat 117*a*, the male fastener 118*a* is fixed onto the seat 117*a* after being resiliently pressed inward and resiliently returning outwards into the female fastener 117*a*1, whereby making the connector 118 fixed on the seat 117*a*.

In one embodiment, the connector 118 is made of a rigid material selected from polycarbonate (PC), polyoxymethylene (POM), Acrylonitrile Butadiene Styrene (ABS), Polyvinylchloride (PVC), Polyethylene (PE), Polypropylene (PP) or combinations thereof.

In one embodiment, the connector 118 has at least one guiding hole formed on a sidewall thereof. As shown in FIGS. 2 and 3A-3B, one sidewall of the connector 118 has an elongated guiding hole 118*b*1. In other embodiments, the guiding hole of the connector 118 may have a circular, oval or square configuration.

Figure 4:
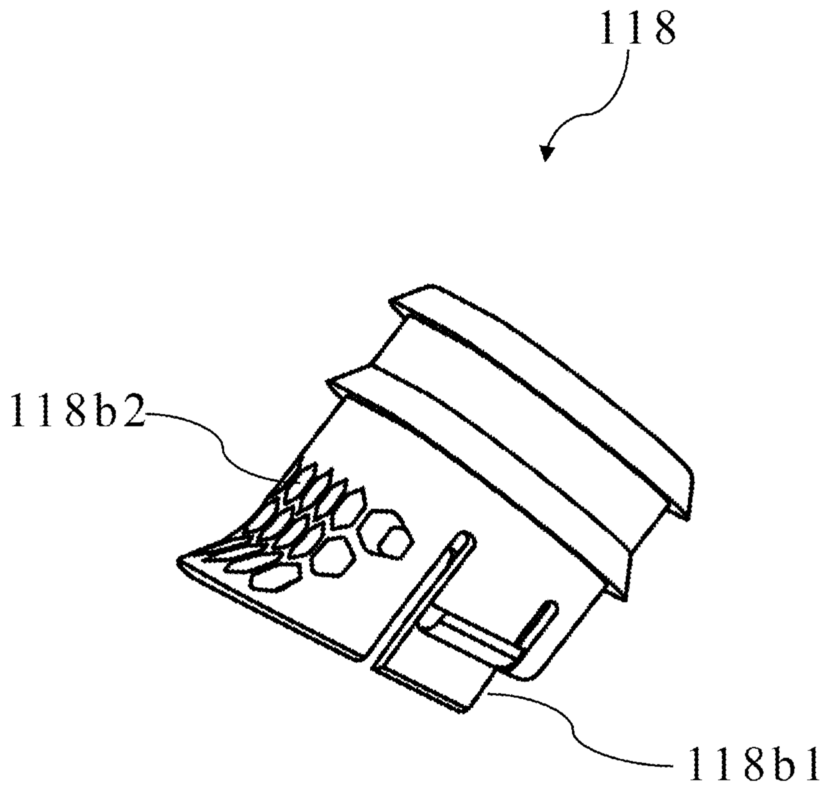
FIG. 4 is a schematic view of the connector according to another embodiment of the present invention.

In addition, in an implementation, as shown in FIG. 4, the other sidewall of the connector 118 may include a plurality of guiding holes 118*b*2 arranged in a honeycomb shape. However, in other embodiments, the guiding holes may be arranged in a mesh shape, a honeycomb shape, a grille shape or any combination thereof. The arrangement that the sidewall of the connector 118 proximal to the user's nose is designed to have the above-mentioned guiding holes can provide the air intake path from the lower chamber 204 when the user inhales through the mouth, and can also provide the path for the water leaking in the mask to flow into the reservoir formed around the purge valve 117. In addition, it is more effective to prevent the water of the reservoir from splashing back to the nose when the user exhales heavily to force the water to drain from the mouthpiece 119 to the purge valve 117.

In reference to FIG. 3A again, the breathing tube 13 may include an intake conduit 13*a* and an exhaust conduit 13*b* adjacent to the intake conduit 13*a*. The body 11 may further include an intake passage (not shown) formed between the intake conduit 13*a* and the lower chamber 204, and an intake one-way valve 1121*a* disposed on the nose covering portion 115*c* for fresh air entering from the outside through the intake conduit 13*a* and the intake passage, then into the lower chamber 204. Furthermore, the body 11 further includes an exhaust passage (not shown), formed between the exhaust conduit 13*b* and the lower chamber 204 and an exhaust one-way valve 1123*a* optionally provided on the nose covering portion 115*c* for dirty air exhaled by the user to be discharged outwards through the exhaust passage and the exhaust conduit 13*b*.

Since FIG. 3A only shows one side of the breathable mask 3, it is understandable that the other side of the breathable mask 3 can also be symmetrically provided, on the nose covering portion 115*c*, with another intake one-way valve 1121*a* and another exhaust one-way valve 1123*a*. Furthermore, the intake conduit 13*a* can be designed as single-passage in the middle inside and the exhaust conduit 13*b* can be designed as a double-passage on the left and right sides inside the breathing tube 13. Therefore, according to the design requirement of the intake conduit 13*a* and the exhaust conduit 13*b*, it can be defined various types of intake and exhaust passage by the lens frame 111*a*, the lens 113 and/or the waterproof skirt 115. Accordingly, any masks with the design of the breathing tube having the intake conduit and the exhaust conduit, and with the design of the body having the intake passage and the exhaust passage to make fresh air enter the lower chamber from the outside and the dirty air exhaled by the user to be discharged to the outside are all applicable to the structure of the breathable mask having a mouthpiece as the present invention sets forth.

Figure 5A:
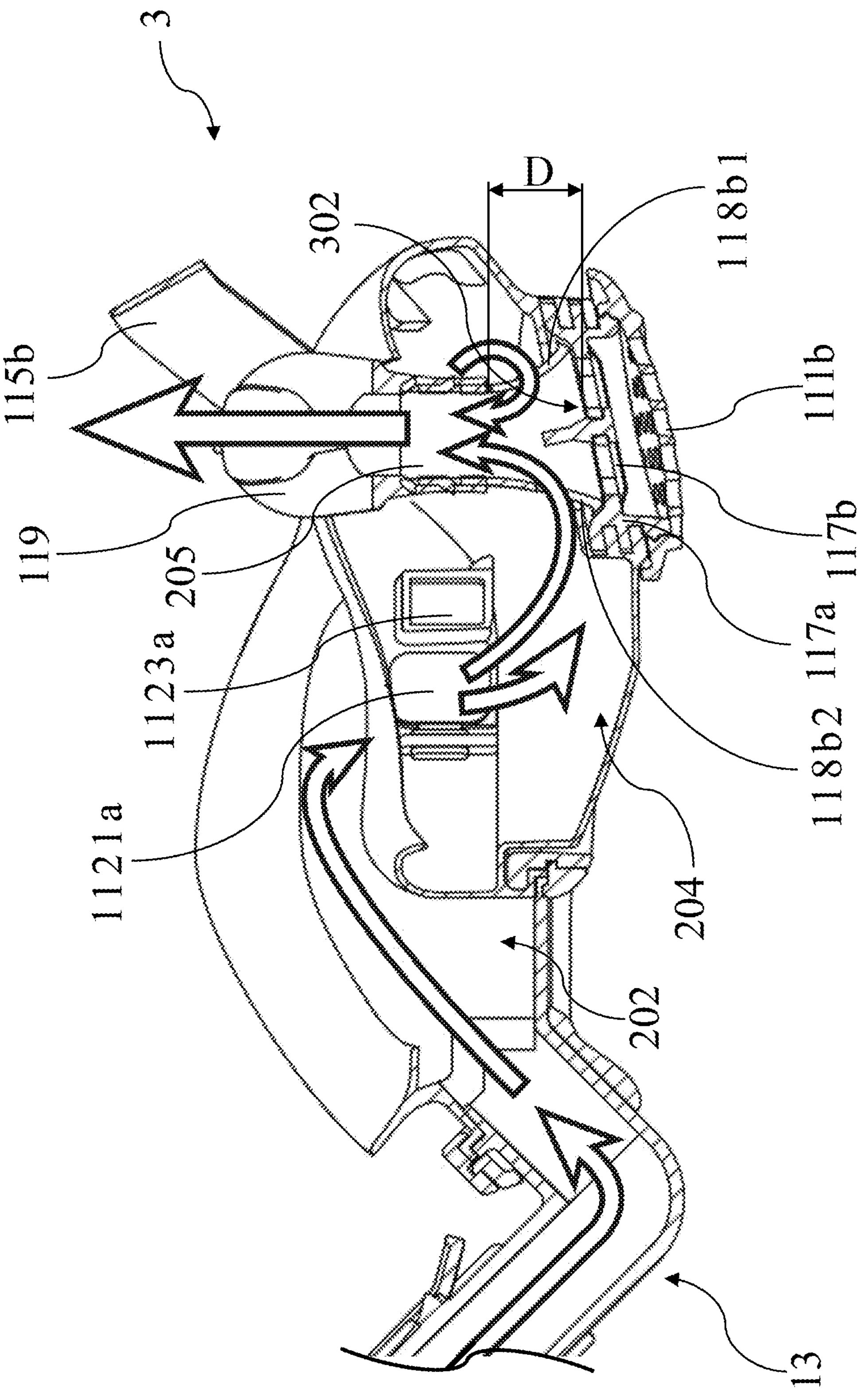
FIG. 5A is a sagittal cross-sectional view, taken from line 5A-5A of FIG. 1B, which, corresponding to FIG. 2, shows the intake airflow.
Figure 5B:
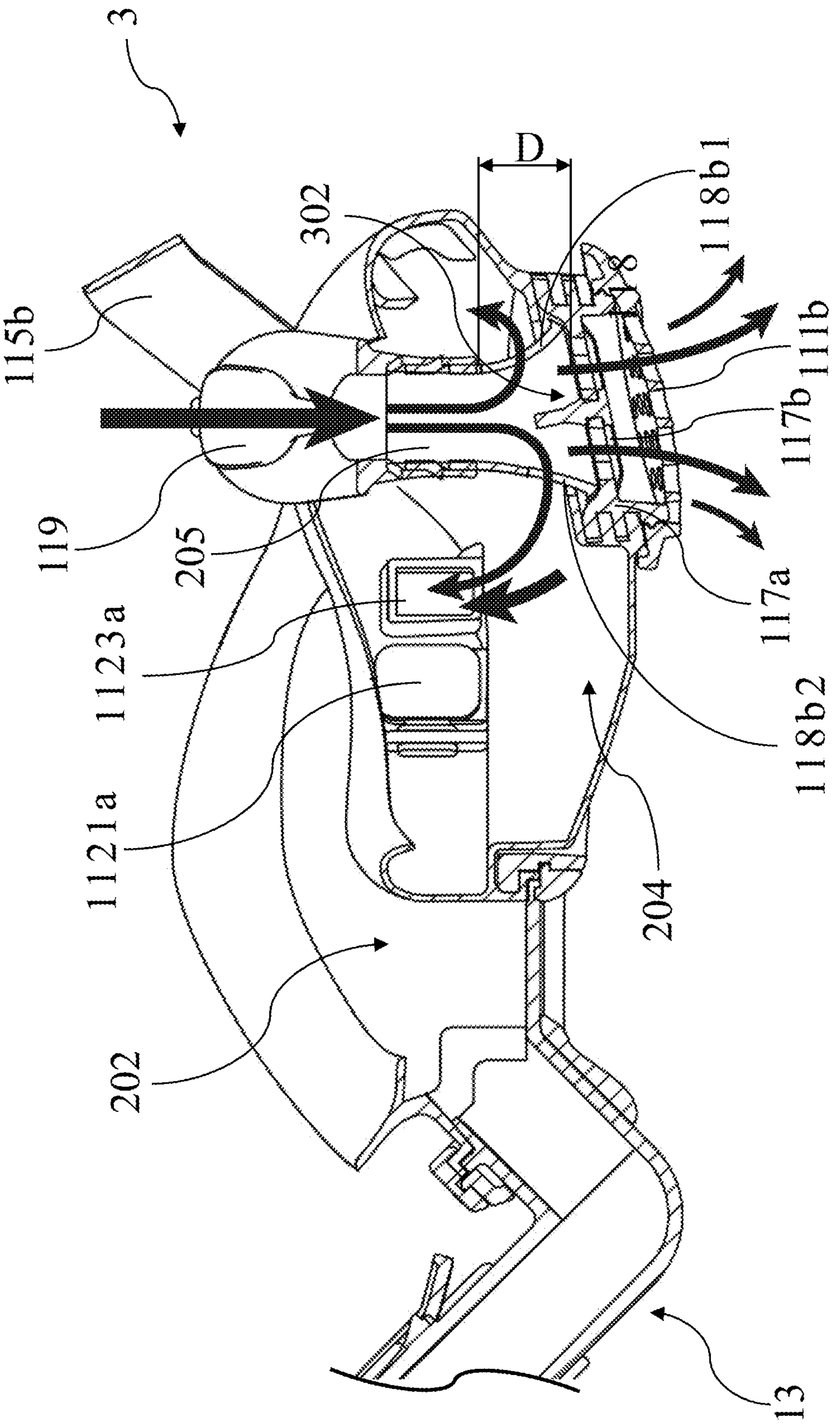
FIG. 5B is a sagittal cross-sectional view, taken from line 5B-5B of FIG. 1B, which, corresponding to FIG. 2, shows the flows of exhaust and drainage.

The fourth embodiment of the present invention is shown in FIGS. 5A and 5B. In view of the volume of the lower chamber 204 well controlled at about 200 ml, the distance D between the second end 119*b* of the mouthpiece 119 and the seat 117*a* of the purge valve 117 can range between 5 mm and 30 mm. As shown by the hollow airflow lines in FIG. 5A, when the user snorkels and inhales through the mouth, fresh air can enter the upper chamber 202 through the breathing tube 13, then enter the lower chamber 204 through the intake one-way valve 1121*a*, and finally enter the mouth via the connector 118 and the mouthpiece 119 through the guiding holes 118*b*1 and 118*b*2 of the connector 118.

On the other hand, as shown by the solid airflow line in FIG. 5B, when the user snorkels, the water leaking in the mask will flow into the reservoir 302 formed around the purge valve 117 through the guiding holes 118*b*1 and 118*b*2 of the connector 118. Therefore, when the user exhales heavily through the mouth, the exhaled dirty air can pass through the connector 118 to the purge valve 117 to push the film 117*b* to open, together with draining the water held in the reservoir 302. At the same time, the dirty air exhaled by the user through the mouth and/or nose can also be exhaled outwards from the lower chamber 204, through the optionally provided exhaust one-way valve 1123*a*, the exhaust passage and the breathing tube 13.

Figure 6:
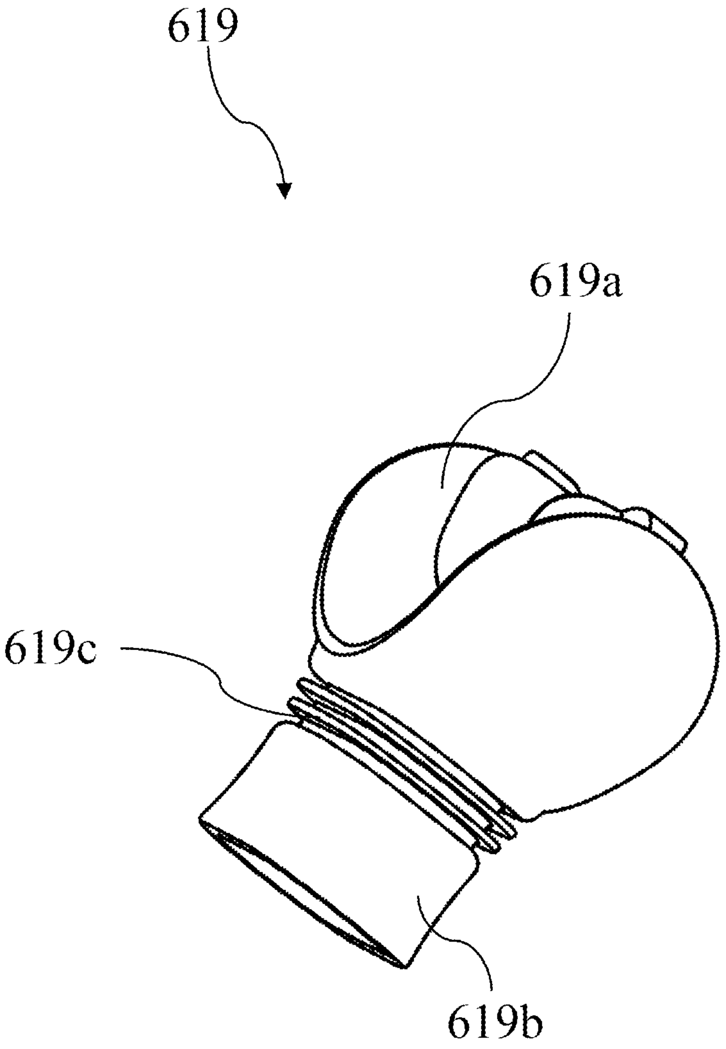
FIG. 6 is a schematic view of the mouthpiece according to another embodiment of the present invention.

The fourth embodiment of the present invention is shown in FIG. 6, illustrating a mouthpiece 619 of the present invention, which applies to the breathable masks 1, 2, and 3 of the above embodiments. The mouthpiece 619 is made of a soft material. Likewise, the mouthpiece 619 has a first end 619*a* (proximal to the user) for the user's mouth to contain and a second end 619*b* (distal from the user) opposite to the first end 619*a*. In addition, in this embodiment, the mouthpiece 619 further has a flexible tube body 619*c*. The flexible tube body 619*c* may have a multi-folded structure, as shown in FIG. 6. However, in other embodiments, the flexible tube body 619*c* may have a coiled tube curved structure.

In this way, the mouthpiece 619 is stretchable because of its own soft material and can increase the moving range so as to better fit users of various ages, genders, and shapes of face and mouth, thereby increasing the comfort of use.

This way, the arrangement that the mouthpiece 619 is designed stretchable, flexible or resilient allows necessary to align the purge valve 117 in a precise position with the user's mouth, and the user can therefore feel more comfortable when wearing the mask. In this case, the user can still drain and exhaust air by means of the channel 205 in fluid communicating the mouthpiece 119 with the purge valve 117.

To conclude, the breathable mask of the present invention provides a channel for fluid communicating the mouthpiece with the purge valve, so that the user can exhale through the mouth to perform effective drainage and exhaust when snorkeling, thus increasing the user's safety and comfort when snorkeling and reducing the chance of interrupting snorkeling due to water leaking into the mask. Moreover, the breathable mask of the present invention allows the mouthpiece to be contained by the user, which can make the wearing of the mask more stable and the design of the head strap more flexible. It becomes possible to use the two-point fixed head strap to tie up the mask onto the user's head, without the need of choosing the three-point or four-point fixed head strap having a much more complicated structure.

The above-mentioned embodiments are only used to illustrate the implementations of the present invention and explain the technical features of the present invention, and are not used to limit the scope of the present invention. Any changes or equivalent arrangements that can be easily accomplished by people skilled in this art fall within the scope of the present invention, and the scope of the present invention should be based on the claims of the patent application.

What is claimed is:

1. A breathable mask, comprising:
- a breathing tube; and
- a body connected to the breathing tube so that an interior of the body is in fluid communication with an outside through the breathing tube, the body comprising:
  - a main frame;
  - a lens connected to the main frame;
  - a waterproof skirt having a portion embedded in the main frame and having a partition to divide the interior of the body into an upper chamber and a lower chamber;
  - a purge valve disposed in a lower portion of the body and being in one-way fluid communication with the lower chamber;
  - a mouthpiece disposed at the lower chamber and having a first end configured to be contained in a mouth of a user and a second end opposite to the first end to be in fluid communication with the purge valve; and
  - a connector disposed between the purge valve and the mouthpiece, wherein at least one guiding hole is formed on a sidewall of the connector and a plurality of guiding holes are formed on an opposite sidewall of the connector.

2. The breathable mask of claim 1, wherein, the connector is fixed to, integrally formed with or detachably connected to at least one of the purge valve and the mouthpiece.

3. The breathable mask of claim 2, wherein the main frame includes a lens frame for the lens to be embedded therein, and a mouth frame located below the lens frame, and the lens frame and mouth frame are configured to cover eyes and the mouth of the user, respectively; wherein the waterproof skirt further includes a nose covering portion and a mouth skirt portion, the nose covering portion protrudes outwards between the lens frame and the mouth frame, and the purge valve is interposed between the mouth frame and the mouth skirt portion.

4. The breathable mask of claim 3, wherein the purge valve has a seat and a film disposed on the seat, and the seat is disposed on an opening formed on the mouth skirt portion.

5. The breathable mask of claim 4, wherein the connector is in hold-down connection with the purge valve, wherein the connector is provided with a male fastener, and the seat is provided with a female fastener being detachably coupled to the male fastener so that when the connector is assembled with the seat, the male fastener is fixed onto the seat after being resiliently pressed inward and resiliently returned outwards into the female fastener to make the connector be fixed on the seat.

6. The breathable mask of claim 1, wherein the plurality of guiding holes are arranged in a honeycomb shape.

7. The breathable mask of claim 1, wherein the at least one guiding hole has an elongated, circular, oval or square profile.

8. The breathable mask of claim 1, wherein a distance between the second end of the mouthpiece and a seat of the purge valve ranges between 5 mm and 30 mm.

9. The breathable mask of claim 1, wherein the connector is made of a rigid material selected from polycarbonate (PC), polyoxymethylene (POM), Acrylonitrile Butadiene Styrene (ABS), Polyvinylchloride (PVC), Polyethylene (PE), Polypropylene (PP) or combinations thereof.

10. The breathable mask of claim 1, wherein the mouthpiece is fixed to, integrally formed with or detachably connected to the purge valve.

11. The breathable mask of claim 1, wherein the mouthpiece is made of a soft material and has a flexible tube body.

12. The breathable mask of claim 11, wherein the flexible tube body has a multi-folded structure.

13. The breathable mask of claim 1, wherein a channel is formed between the mouthpiece and the purge valve, and the channel has an inner volume less than 20 ml.

14. The breathable mask of claim 1, wherein the breathing tube includes an intake conduit and an exhaust conduit adjacent to the intake tube, and the body further includes:
- an intake passage formed between the intake conduit and the lower chamber and provided with at least one intake one-way valve for fresh air entering from the outside through the intake conduit and the intake passage into the lower chamber; and
- an exhaust passage formed between the exhaust conduit and the lower chamber and provided with at least one exhaust one-way valve for dirty air exhaled from the user to be discharged outwards through the exhaust passage and the exhaust conduit.

* * * * *